L. M. Doddridge,

Milk Pail.

No. 103,158. Patented May 17, 1870.

Attest

Inventor
L. M. Doddridge
D. P. Holloway & Co
Atty

United States Patent Office.

LOYAL M. DODDRIDGE, OF NEW MOUNT PLEASANT, INDIANA.

Letters Patent No. 103,158, dated May 17, 1870.

IMPROVEMENT IN MILK-PAILS WITH STRAINERS ATTACHED.

The Schedule referred to in these Letters Patent and making part of the same.

*To all whom it may concern:*

Be it known that I, LOYAL M. DODDRIDGE, of New Mount Pleasant, in the county of Jay and State of Indiana, have invented certain Improvements in Milk-Buckets; and I do hereby declare that the following is a full, clear, and exact description thereof, reference being had to the annexed drawings making part of this specification, in which—

Corresponding letters denote corresponding parts in both figures.

Figure 1:
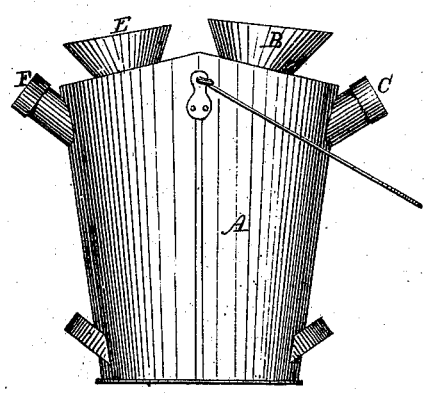
Figure 1 is an elevation of my improved bucket, showing the funnels on its top through which the milk passes into the same, and the nozzles upon its sides through which it is strained out.

In milk-buckets, as heretofore constructed for straining the milk from them, no provision has been made for keeping the strippings separate from the first milking, or that portion of the milk first extracted from the animal; and, as a consequence, the two kinds of milk have been allowed to mingle in said bucket.

The desirableness of keeping the strippings or richer portion of the milk separate from the first or poorer portion has long been recognized, but it has been common to use a separate vessel for that purpose, thus causing great inconvenience to the dairyman, and necessitating a delay in straining the same until it can be carried to some suitable place for that purpose.

The present invention is designed to remedy the objections above alluded to, and to this end—

It consists in producing a milk-bucket having a large compartment for the reception of the first extracted or poorer portion of the milk, and another and smaller compartment for the reception of the last extracted or richer portion, so arranged that the whole operation may be performed without removing the bucket, as will be more fully described hereinafter.

A in the drawings refers to a milk-bucket which may be of any approved from, and of any desired size; it is to be provided with a bail for lifting and carrying the same, and with handles for tilting it when it is desirable to empty out its contents.

Upon the top of that portion or compartment of the bucket designated by the letter A', there is to be a funnel-shaped projection, B, which, at its lower end, communicates with such compartment.

Into this funnel the first portion of the milk extracted is directed, and is discharged therefrom through the strainer-covered spout C, which is attached to the side of the bucket near its upper end.

The strainer shown in the drawings is composed of a ring of metal, the interior diameter of which is of a size to permit it to be slipped over the end of the spout C, while, to its outer end, there is to be soldered a disk of fine wire-gauze for straining the milk as it passes out.

Figure 2:
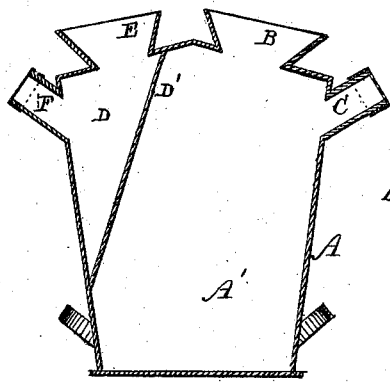
Figure 2 is a vertical central section of the same, showing a large compartment for the first milking, and a smaller one for the strippings or last milking, and the nozzles covered with strainers through which the milk is poured from the bucket.

D refers to a smaller compartment of the bucket, which is formed by extending a partition, D', across the same, as shown in fig. 2.

The upper portion of this compartment is to be provided with a funnel, E, which communicates therewith, and with a strainer-covered spout, F, similar to those already described.

Into the last-named compartment the strippings or richer portion of the milk is to be directed, by which means it will be kept separate from the other or poorer portion, and from which it may be strained through the spout F into any vessel prepared for its reception.

I have described the strainers attached to the bucket as formed of a ring of metal and of wire-gauze, by which means they are easily detached from the spouts for cleaning; but it is apparent that any suitable kind of cloth may be used if preferred, such cloth being held in position by the hand, or it may be secured to the spout by a string, or by a piece of small wire.

Having thus described my invention,

What I claim, and desire to secure by Letters Patent, is—

1. A milk-bucket, combining in its construction two compartments, each having its induction and eduction-apertures, substantially as and for the purpose set forth.

2. The arrangement of the induction-funnels B and E, and eduction-spouts C and F, substantially as shown and described.

In testimony whereof I have signed my name to this specification in the presence of two subscribing witnesses.

LOYAL M. DODDRIDGE.

Witnesses:
CHARLES P. STARK,
C. C. CARTWRIGHT.